H. D. STEWART.
TAPER CUTTING ATTACHMENT FOR LATHES.
APPLICATION FILED MAY 14, 1915.
1,226,825.   Patented May 22, 1917.
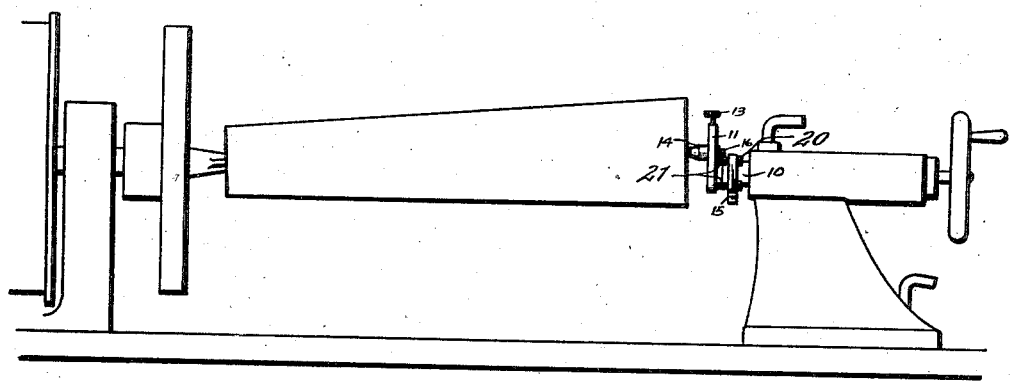
Fig. I
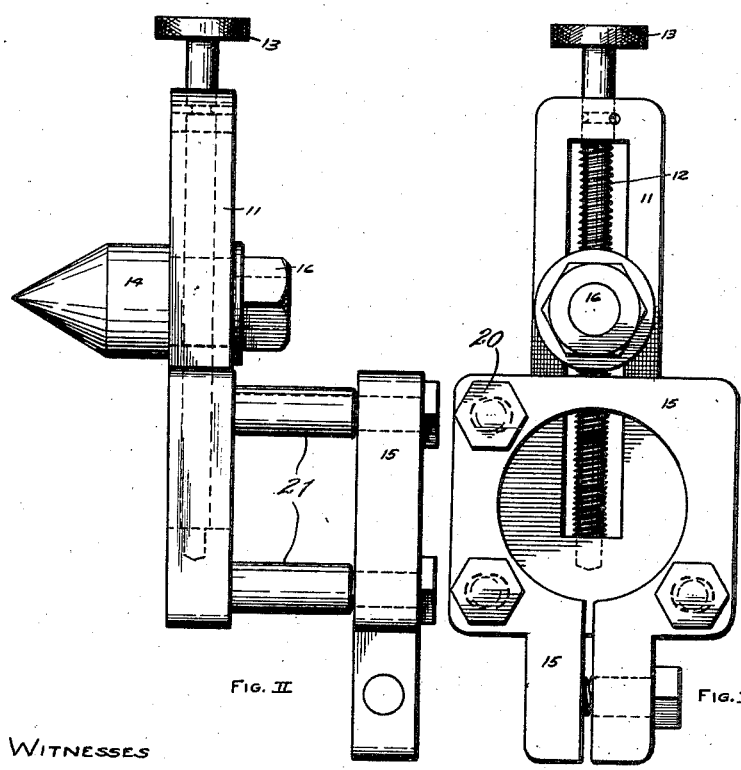
Fig. II   Fig. III
WITNESSES
INVENTOR
HARRY D. STEWART
BY
ATTORNEY

UNITED STATES PATENT OFFICE.

HARRY D. STEWART, OF GILMAN, IOWA.

TAPER-CUTTING ATTACHMENT FOR LATHES.

1,226,825.   Specification of Letters Patent.   Patented May 22, 1917.

Application filed May 14, 1915. Serial No. 27,999.

*To all whom it may concern:*

Be it known that I, HARRY D. STEWART, a citizen of the United States, residing in Gilman, county of Marshall, and State of Iowa, have invented a new and useful Improvement in Taper-Cutting Attachments for Lathes, of which the following is a specification.

The object of my invention is to provide a tapering attachment for lathes, adapted to be easily and quickly secured thereto, and to provide for accurate adjustment for forming any tapering angle desired, on the shaft which is being shaped. A further object is to provide a device of this character adapted to be secured to any lathe and to be sufficiently simple, strong and durable, in construction as to be within the reach of any machinist who may desire same.

My invention consists of certain details of construction, hereinafter set forth, pointed out in my claim, and illustrated in the accompanying drawings, in which Figure I shows a side elevation view of a lathe, with my attachment secured thereto, and a shaft being formed, the cutting tool being omitted; and Figs. II and III show enlarged detail views of my device.

Referring to the accompanying drawings the reference numeral 10 is used to indicate the tail stock of a lathe, and it is to this part of the lathe that my device is secured.

My device consists of a member 11 formed with a longitudinal opening therein which is provided with parallel sides. A screw threaded shaft, 12 is mounted longitudinally in said opening, and is designed for rotation in its bearings, said shaft extending upwardly through the member 11 and provided with a head 13, by means of which the rotation is accomplished. A traveling dead center 14 has a transverse aperture in its shank receiving the screw threaded shaft 12 and the rotation of the shaft moves the said dead center in either direction, as determined by the direction of rotation of the shaft. The member 11 is secured to a bearing 15 designed to clamp upon the tail stock of the lathe.

The traveling dead center 14 is provided with a threaded shank receiving a nut 16 by means of which it may be rigidly secured to the member 11, so that the screw threaded shaft 12 may not be rotated. Transverse bolts 20 are connected to the two members 11 and 15 and receive sleeves 21 which effect predetermined spacing of these members. The manner of securing the said clamping effect is so obvious and so completely illustrated in the drawings, that I will not further describe the same.

In practical operation the shaft to be shaped in a taper construction is secured, in the ordinary manner, between the arbor and the dead center. The dead center is then moved, on the screw threaded shaft 12, by rotation of said shaft, until the desired radius is secured. As the cutting tool (not shown) travels on a fixed path and as the distance from this path to the dead center is of different length than the distance from this said path to the center of the arbor, it is obvious that a tapered shaft will be produced.

I am aware that different devices to accomplish this object have been invented and used, but I am not aware that so simple and accurate a device as I have shown and described, susceptible of being secured to any lathe, has ever been produced.

Having thus described my invention, what I claim and desire to secure by Letters Patent of the United States, is:

In a taper attachment for lathes, embodying a bearing plate-like member formed for clamping onto the tail stock of a lathe, a vertically disposed plate longitudinally slotted and arranged in front of said member and in spaced relation thereto, horizontal bolts connected to the plate and member to support the plate from the member, sleeves on the bolts abutting the plate and member to space same, a threaded shaft mounted for rotation in the slot and having its upper end projecting through the top of the plate and having a head thereon to permit of turning of the shaft, a dead center member having a shank extending through the slot of the plate and having a threaded opening in the shank receiving said shaft, and a nut on the dead center member to clamp against the rear face of the plate to hold the dead center member locked, said connecting bolts between the plate and member being disposed so that the clamping nut of the dead center member may move into and be operated in the space between the plate and member.

HARRY D. STEWART.

Witnesses:
 ZELL G. ROE,
 F. MOENCK.